United States Patent
Son et al.

(10) Patent No.: US 6,944,229 B2
(45) Date of Patent: Sep. 13, 2005

(54) APPARATUS AND METHOD FOR MPEG DECODING USING DYNAMIC FREQUENCY AND VOLTAGE SCALING

(75) Inventors: Donghwan Son, Daejeon (KR); Chansu Yu, Cleveland, OH (US); Heung-Nam Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 607 days.

(21) Appl. No.: 10/119,852

(22) Filed: Apr. 11, 2002

(65) Prior Publication Data

US 2003/0118112 A1 Jun. 26, 2003

(30) Foreign Application Priority Data

Dec. 24, 2001 (KR) ........................................ 2001-84437

(51) Int. Cl.[7] ................................................. H04N 7/12
(52) U.S. Cl. ................................................. 375/240.25
(58) Field of Search ...................... 375/240.25; 713/320, 713/323; 348/423

(56) References Cited

U.S. PATENT DOCUMENTS

| | | | |
|---|---|---|---|
| 5,812,860 A | | 9/1998 | Horden et al. |
| 6,047,248 A | * | 4/2000 | Georgiou et al. ........... 702/132 |
| 6,369,855 B1 | * | 4/2002 | Chauvel et al. .......... 348/423.1 |
| 6,509,788 B2 | * | 1/2003 | Naffziger et al. ........... 327/548 |
| 6,845,456 B1 | * | 1/2005 | Menezes et al. ............ 713/320 |
| 2003/0028569 A1 | * | 2/2003 | Brokish ...................... 708/322 |

OTHER PUBLICATIONS

Tajana Simunic et al, "Dynamic Voltage Scaling and Power Management for Portable Systems", DAC 2001, Jun.18–22, 2001.*

Donghwan Son, Chansu Yu and Heung-Nam Kim, "Dynamic Voltage Scaling on MPEG Decoding", Proceedings of the Eigth International Conference on Parallel and Distributed Systems, pp. 633–640, Jun. 26–29, 2001, Kyongju City, Korea.

Trevor Pering, Tom Burd, Rober Brodersen, "The Simulation and Evaluation of Dynamic Voltage Scaling Algorithms", Proceedings 1998 International Symposium on Low Power Electronics and Design, pp. 76–81, Aug. 10–12, 1998, Monterey, California, United States.

* cited by examiner

*Primary Examiner*—Nhon Diep
(74) *Attorney, Agent, or Firm*—Mayer, Brown, Rowe & Maw LLP

(57) ABSTRACT

There is provided an apparatus and method for MPEG decoding using dynamically varying voltage and frequency of a processor, wherein an operation frequency and voltage of the processor is set depending on a difference between the number of current frames and that of set frames, in correspondence with the interrupt generated during decoding frames until a next interrupt is generated, to thereby support a real-time decoding. The method herein includes the steps of predicting decoding time until the next interrupt from the current interrupt is generated depending on both a type and size of frames and the system speed.

12 Claims, 5 Drawing Sheets

APPARATUS AND METHOD FOR MPEG DECODING USING DYNAMIC FREQUENCY AND VOLTAGE SCALING

FIELD OF THE INVENTION

The present invention relates to an MPEG (Moving Picture Experts Group) decoding technique; and, more particularly, to an apparatus and method for MPEG decoding using dynamic frequency and voltage scaling of a processor.

BACKGROUND OF THE INVENTION

In general, a processor installed in a mobile apparatus consumes a large portion of energy consumed in the mobile apparatus as mobile computing operations become complicated and a demand for an embedded system increases.

Electric power consumption of the processor is proportional to not only an operation frequency of the processor but also the square of a voltage thereof. Thus, to reduce the voltage of the processor is the most efficient way in reducing the electric power consumption of the processor. However, in case the voltage of the processor is reduced, the operational frequency thereof need be also reduced depending on the reduced voltage, so that the performance of the system is deteriorated.

In order to keep the balance between the performance of the system and the electric power consumption thereof, dynamic voltage scaling (DVS) is a technique for scaling the dynamic voltage of the processor at run-time by a voltage scheduler to reduce the energy consumption.

FIGS. 1A and 1B show graphs which represent schematic examples of shutdown mechanism and DVS. The shutdown mechanism is a conventional technique for reducing the electric power consumption, which is a way for stopping the operation of the processor during idle time.

Referring to FIGS. 1A and 1B, a horizontal axis represents time T, while a vertical axis indicates voltage V and clock frequency. W1, W2 and W3 are areas of works, which mean workloads.

The workloads W1, W2 and W3 are performed with a maximum voltage, it is shutdown during the idle-time, and the total energy consumption is 8 energy unit as shown in FIG. 1A.

On the contrary, the voltages in FIG. 1B, are set respectively for 3/5 V, 1/3 V and 2/3 V, so that the total energy consumption is 2.97 energy unit $((3/5)^2 \times (3/5) \times 5 + (1/3)^2 \times (1/3) \times 3 + (2/3)^2 \times (2/3) \times 6 = 2.97)$.

In order to minimize the energy consumption by adjusting the voltage, the workload should be predicted precisely to apply a clock speed and voltage suitable for the workload to the system. The prediction of the next workload is usually realized by analyzing the previous system workload. However, it is difficult to predict the workload precisely in case the workload is changed greatly.

A plurality of voltages and operation frequency levels for use in many processors can be changed dynamically by a user's demand. Moreover, a DC—DC converter is capable of efficiently making latency based on voltage change minimized.

Now, multimedia occupies a large part on applications for the mobile computing more and more, so that a MPEG decoder is one of these applications to require a large electric power in the processor.

One of the features of the MPEG decoder is that the time required in decoding a frame varies widely, from frame to frame, due in part to the fact that a given MPEG video stream contains different frame types, and in part to the potential wide variation between scenes, which makes it difficult to predict the next workload based on the previous workload, so that a voltage can be adjusted inefficiently.

A MPEG stream for use in MPEG decoding includes an array of frames. The frames have I, P and B frames and are repeated according to a regular rule. The set of the minimum unit frames repeated according to the regular rule is called Group Of Pictures GOP.

The decoding time of these frames is proportional to the size of a frame and is set diversely according to the type of the frame. There is a method for predicting the decoding time of an arbitrary system by using the type and size of the frame, which is described in "Predicting MPEG execution time, SIGPMETRICS/PERFORMANCE 98, Int., 1 Conf. on Measurement and Modeling of computer Systems: 131–140 (1998.6)".

Another feature of the MPEG decoding is that it should support a real-time decoding. The technique applied in order to support the real-time decoding generates interrupts periodically during decoding to compare the number of set frames from the previous interrupt with the number of actually current frames to thereby adjust the decoding speed, wherein the number of the set frames is the number of the frames which should be passed while the number of the actually current frames is the number of the passed frames.

There are two modes for supporting the real-time decoding, wherein one is a delay mode, which delays time through busy waiting or sleep operation as much as the delayed time is set in proportional to the high speed of the system during decoding the frames in case the system speed is higher than that for the real-time decoding, while the other is a drop mode, which drops the frames selectively at a drop rate set in proportional to the low speed of the system in case the system speed is lower than that for the real-time decoding.

Referring to FIG. 2, there is shown that two frames are more decoded during one second in case the number of the frames per second is 30. The busy waiting or sleep operation is performed during decoding a next frame by a diff value. The diff value means an allocated variable, i.e., the number of exceeded frames. The diff value shows how close the actual system speed is to the system speed for the real-time decoding, so that more frames than frames fixed per second are played if the diff value is a positive integer, while less frames than the frames fixed per second are played if the diff value is a negative integer.

Referring to FIG. 3, a delay value is increased according to the number of exceeded frames in case the diff value is a positive integer and a previous mode is a delay mode, while a frame drop rate is decreased in proportional to the number of the exceeded frames or a drop mode is changed to the delay mode in case the diff value is a positive integer and the previous mode is the drop mode. It is the opposite in case the diff value is a negative integer.

As described above, the busy waiting or sleep operation has drawbacks in the electric power consumption in that it is generated in delaying the time for the real-time decoding. Also, the method for setting a delay value according the previous mode is based on how close the decoding is performed to the real-time decoding at previous time intervals, so that the value can be inaccurate since the workload is changed considerably in the MPEG decoding. Moreover, the diff value becomes large in case the workload is changed considerably, so that it leads to deteriorate the real-time decoding by dropping many frames or allocating delay values unnecessarily.

SUMMARY OF THE INVENTION

It is, therefore, an object of the present invention to provide an apparatus and method for MPEG decoding using dynamically varying voltage and frequency of a processor, wherein the voltage and frequency of the processor is determined by predicted MPEG decoding time of next time interval.

In accordance with one aspect of the present invention, there is provided an apparatus for MPEG decoding using dynamically varying voltage and frequency of a processor, comprising: an interrupt generating unit for generating an interrupt; an operation frequency and voltage setting unit for setting an operation frequency and voltage of a processor depending on estimated system workload until a next interrupt is generated; and a decoding unit for decoding frames until a next interrupt is generated.

In accordance with another aspect of the present invention, there is provided a method for MPEG decoding using dynamically varying voltage and frequency of a processor comprising the steps of: (a) determining whether a difference of frames is greater or less than 0, in case an interrupt is generated and a previous mode is a delay mode; (b) reducing the operation frequency and voltage in case the difference of the frames is greater than 0, while increasing the operation frequency and voltage in case the difference of the frames is less than 0, depending on the determination result obtained in the step (a); (c) setting the operation frequency and voltage for maximum operation frequency and voltage until the scaled operation frequency and voltage is compared with the predetermined maximum operation frequency and voltage to exceed the maximum operation frequency and voltage; (d) changing a current mode to a drop mode if it is predicted that the operation frequency and voltage is set for the maximum operation frequency and voltage and the number of the current frames cannot pass as much as that of frames at a next time interval; (e) determining whether the difference of the frames is greater or less than 0, in case the interrupt is generated and the previous mode is the drop mode; (f) increasing a drop rate in case the difference of the frames is less than 0 depending on the determination result obtained in the step (e), while reducing the drop rate in case the difference of the frames is greater than 0; (g) setting the operation frequency and voltage to be less than the maximum operation frequency and voltage and setting the current mode for the delay mode, in case the drop rate is less than 0, after the step (f) is performed; and (h) performing the MPEG decoding by finally set operation frequency, voltage and delay or drop rate until a next interrupt is generated.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
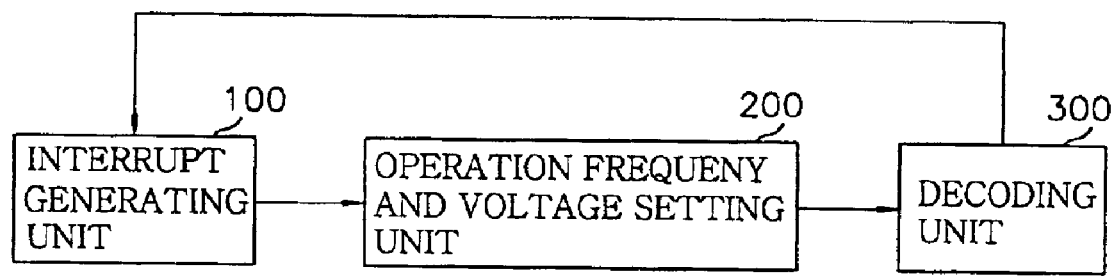
FIG. 4 provides a schematic view of a MPEG decoding apparatus for realizing a method for MPEG decoding using a dynamic voltage scaling in accordance with the present invention.

Referring to FIG. 4, there is shown a schematic view of an apparatus for realizing a method for MPEG decoding using dynamically varying voltage and frequency of a processor in accordance with the present invention.

An apparatus for MPEG decoding as shown in FIG. 4 includes an interrupt generating unit 100 for generating an interrupt, an operation frequency and voltage setting unit 200 for setting an operation frequency and voltage of a processor in order to realize a real-time decoding and a decoding unit 300 for decoding frames until a next interrupt is generated.

Though the interrupt herein can be generated periodically or non-periodically, it should be recognized when the next interrupt will be generated while the current interrupt is being generated.

Figure 5:
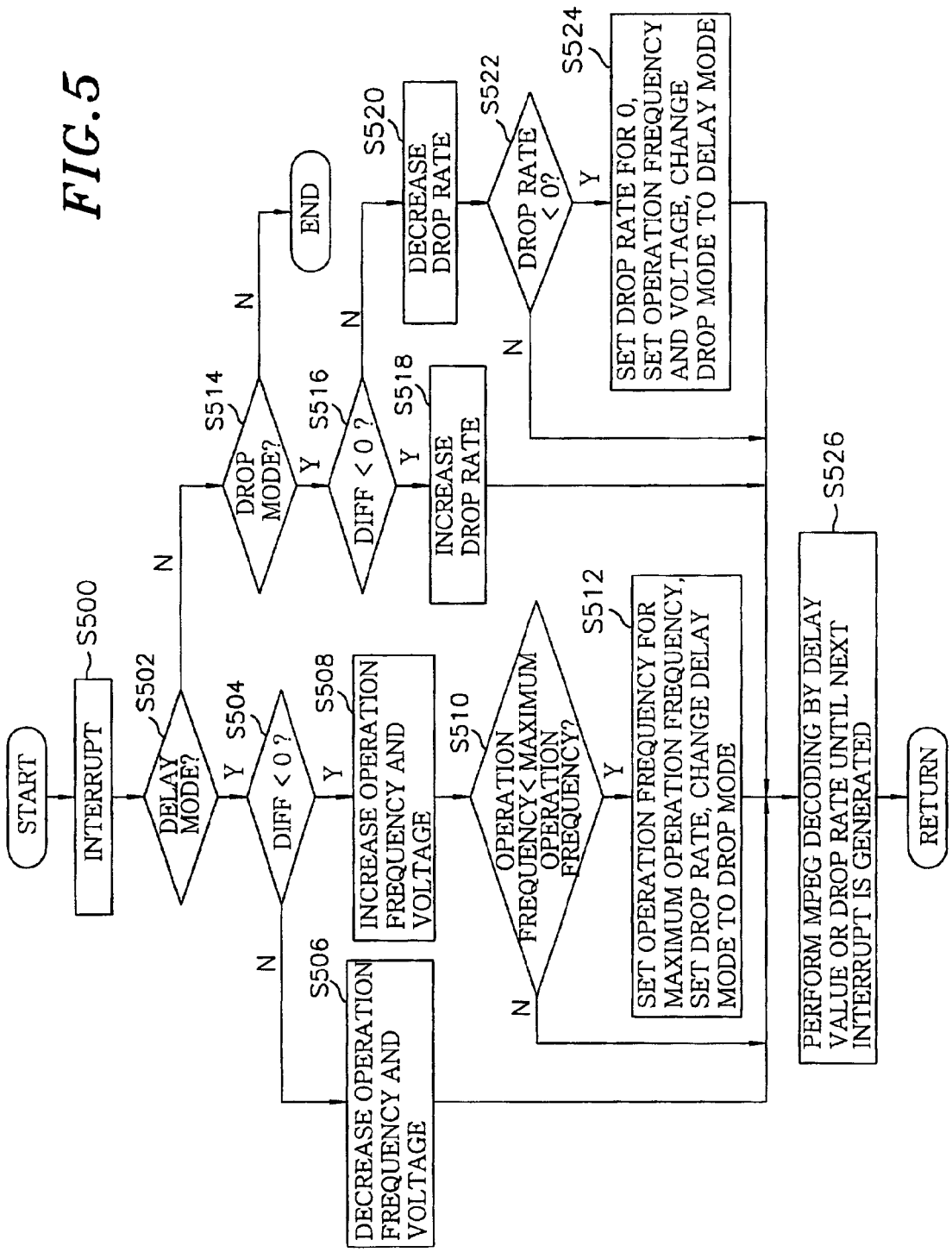
FIG. 5 exhibits a flow chart of a MPEG decoding process for using a dynamic voltage scaling in accordance with a preferred embodiment of the present invention.

Referring to FIG. 5, there is shown a flow chart of a MPEG decoding process for using dynamically varying voltage and frequency of a processor in accordance with a preferred embodiment of the present invention.

Figure 1A:
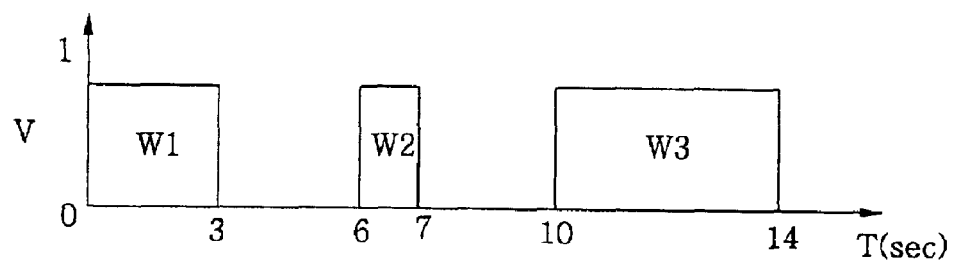
FIG. 1A depicts a graph of the workload performed in a processor according to a shutdown mechanism and FIG. 1B shows a graph of the processor workload according to a dynamic voltage scaling algorithm.
Figure 1B:
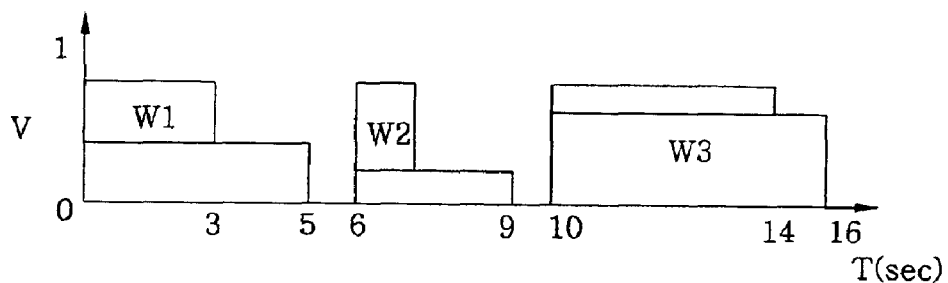
Figure 2:
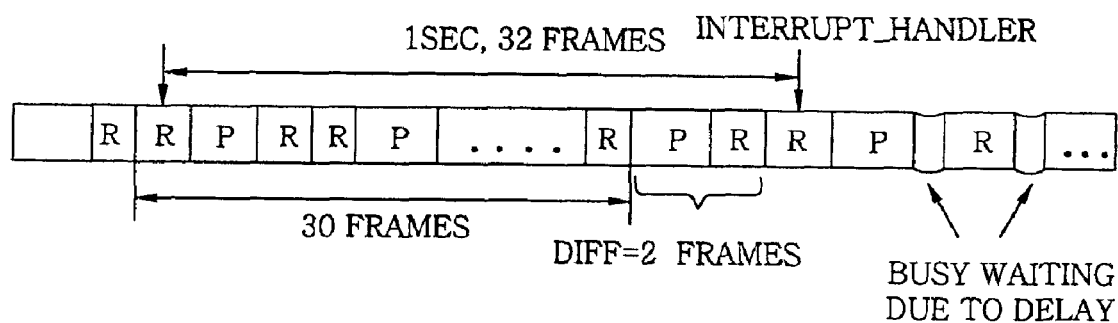
FIG. 2 illustrates an exemplary view for explaining a technique to count a difference between the number of actually decoded frames (32 frames) and that of set frames (30 frames) at a given interrupt interval, e.g., one second interval to thereby realize a real-time MPEG decoding.
Figure 3:
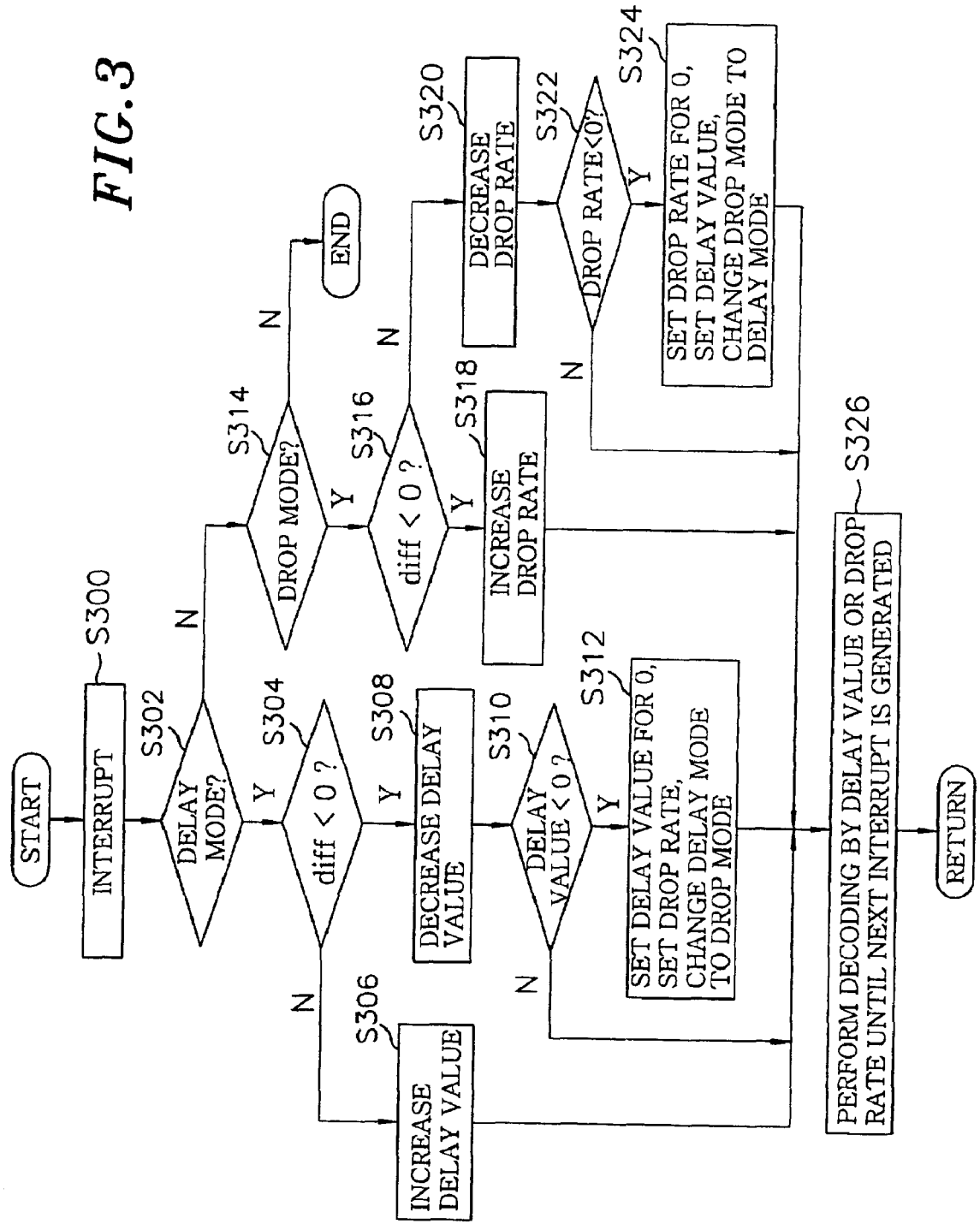
FIG. 3 is a flow chat for explaining a general MPEG decoding process in order to realize the real-time decoding.

The MPEG decoding process in FIG. 5 supports the real-time decoding by scaling the operation frequency and voltage instead of affording busy waiting or sleep operation corresponding to delay values during a delay mode in the existing algorithm of FIG. 3. This process relates not to giving the delay during decoding the frames, but to varying a system speed appropriately enough to meet the real-time decoding in case the system speed is too fast to meet the real-time decoding. Moreover, it can be achieved the real-time decoding by maximizing the operation frequency of the processor as described in the prior art while simultaneously dropping frames appropriately during a drop mode.

As shown in FIG. 5, if an interrupt is generated at step 500, it proceeds to step 502 to determine whether a previous mode is a delay mode.

It proceeds to step 504 to determine whether a diff value is greater or less than 0, if the previous mode is the delay mode depending on the determination result obtained in the step 502.

The diff value represents the difference between the number of actually proceeded frames and that of set frames, which is an index showing how close the actual speed of the system is to the system speed for the real-time decoding.

If the diff value is greater than 0, it proceeds to step 506 to decrease the operation frequency and voltage in proportional to the diff value.

If the diff value is less than 0 depending on the determination result obtained in the step 504, however, it proceeds to step 508 to increase the operation frequency and voltage in proportional to the diff value.

Next, the magnitude of a scaled operation frequency and voltage is compared with that of a predetermined maximum operation frequency and voltage (S510). Then, the operation frequency and voltage is set for the maximum operation frequency and voltage, setting a drop rate to thereby set a current mode to a drop mode until the operation frequency and voltage exceed respectively the maximum operation frequency and voltage (S512). At this time, the current mode is changed to the drop mode to set the drop rate, if it is determined that the operation frequency and voltage are too late to meet the real-time decoding though they are set for the maximum operation frequency and voltage, i.e., if it is predicted that the number of the current frames cannot be passed as many as that of frames at a next time interval.

In the meantime, if the previous mode is the drop mode and the diff value is less than 0 after the interrupt is generated depending on the determination result obtained in the steps 514 and 516, the drop rate is increased in proportional to the diff value (S518). But on the other hand, if the diff value is greater than 0, the drop rate is decreased (S520).

Next, in case the decoding speed is too fast to meet the real-time decoding though the total frames are not dropped (S522), the values of the operation frequency and voltage are set to be less than those maximum values in proportional to the diff value to set the mode for the delay mode (S524).

The decoding finally is performed by the set operation frequency, voltage and delay or drop rate until the next interrupt is generated (S526).

Figure 6:
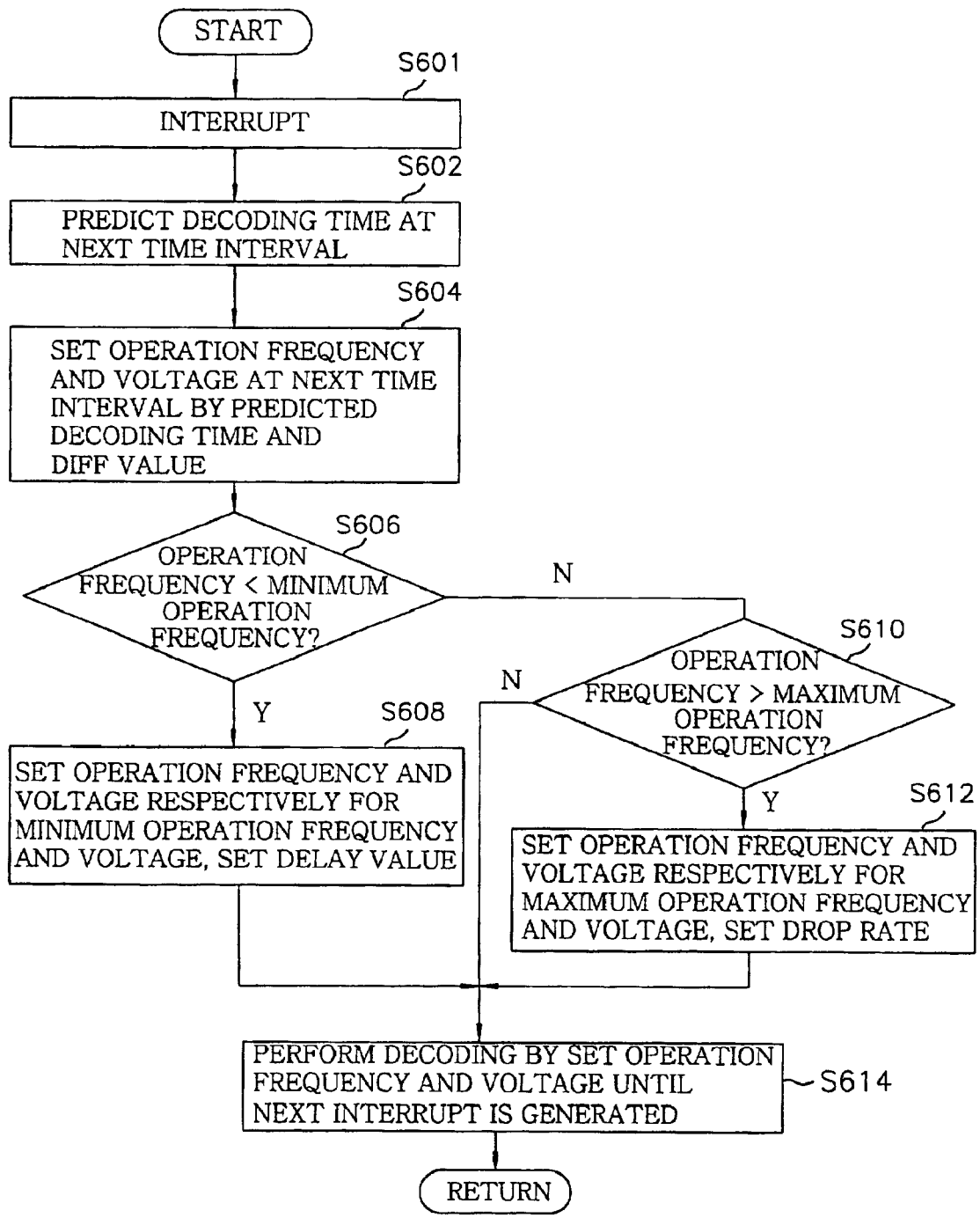
FIG. 6 shows a flow chart of a MPEG decoding process using a dynamic voltage scaling in accordance with another preferred embodiment of the present invention.

Referring to FIG. 6, there is a flow chart of a MPEG decoding process for using dynamically varying voltage and frequency of a processor in accordance with another preferred embodiment of the present invention.

This MPEG decoding process applies the predicted time calculated by type of next frames, i.e., I, P and B frames and size of the respective frames to the decoding time till next interrupt is generated, after an interrupt is generated. The predicted time is compared with the time till the next interrupt is generated, setting the operation frequency and voltage appropriately depending on the case where the predicted time is less than the time till the next interrupt is generated, while making the operation frequency and voltage maximized, setting the drop rate properly to thereby meet the real-time decoding depending on the case where the predicted time is greater than the time till the next interrupt is generated.

As shown in FIG. 6, if the interrupt is generated at step 601, it proceeds to step 602 to predict the decoding time by the next interrupt according to both the type and size of the frames and the system speed by the next interrupt.

At step 604, an operation frequency and voltage until the next interrupt is generated are set by both the predicted decoding time and the diff value described in FIG. 5.

A delay value is set, performing busy waiting or sleep operation during decoding the frames to thereby meet the real-time decoding (S608), in case the system speed is too fast to meet the real-time decoding though the operation frequency is reduced to a minimum operation frequency (S606).

However, each of the operation frequency and voltage is set for the maximum value and the drop rate is set (S612) in case the predicted decoding time is so great that it is impossible to play the number of set frames until the next interrupt is generated, though it is set for the maximum operation frequency (S610).

In the end, the decoding is performed until the next interrupt is generated by the set operation frequency, voltage and delay or drop rate (S614).

As described above, it is difficult to meet the real-time decoding precisely only with the embodiment in FIG. 6 in case the operation frequency and voltage of the processor have no continuous value or the deviation of the discrete values thereof is great. In this case, no operation frequency for the real-time decoding in the embodiment of FIG. 6 can exist actually in the system. Thus, the closest operation frequency provided in the processor in comparison with the operation frequency for the real-time decoding is set and then the delay or drop rate is set to compensate the difference between the closest operation frequency and the operation frequency for the real-time decoding.

In the meantime, it can be realized to set a Quality Of Service QoS level of the decoding or an electric power mode by a user's request in the embodiment of FIG. 5 or 6. This can maintain a balance between the decoding QoS and electric power consumption, reducing the decoding QoS in case the electric power consumption is considered important to thereby adjust the decoding QoS for the purpose of reducing the electric power consumption.

Since this decoding QoS is determined by the drop rate, in order to adjust the decoding QoS, it is determined how many frames have to be dropped depending on the predetermined QoS at the respective time intervals, and furthermore, it is set the operation frequency and voltage for generating that dropping. For example, it is assumed that only 90% of the frames are being decoded if the user sets the electric power mode or QoS level for 0.9. At this time, in order to support the real-time decoding, the operation frequency and voltage can be set while only 90% of the frames are being decoded and 10% thereof are being dropped in a module 200 which sets the operation frequency and voltage in FIG. 4.

On the other hand, the real-time decoding has to be realized even though other applications can be performed during the MPEG decoding. It can be coped properly with the effects of other applications because the diff value feedbacks the decoding condition in FIG. 5. It is necessary to predict the decoding time, while it is being monitored how different the previous decoding time prediction is from the actual time and simultaneously being coped with a change of the applications performed in the processor where the decoding is carried out.

While the present invention has been shown and described with respect to the preferred embodiment, it will be understood by those skilled in the art that various changes and modifications may be made without departing from the spirit and scope of the present invention as defined in the following claims.

What is claimed is:

1. An apparatus for MPEG decoding using dynamically varying voltage and frequency of a processor, comprising:
    an interrupt generating unit for generating an interrupt;
    an operation frequency and voltage setting unit for setting an operation frequency and voltage of a processor depending on estimated system workload until a next interrupt is generated; and
    a decoding unit for decoding frames until a next interrupt is generated;
    wherein the system workload is estimated depending on a predicted MPEG decoding time until a next interrupt is generated.

2. A method for MPEG decoding using dynamically varying voltage and frequency of a processor comprising the steps of:
    (a) determining whether a difference of frames is greater or less than 0, in case an interrupt is generated and a previous mode is a delay mode;

(b) reducing the operation frequency and voltage in case the difference of the frames is greater than 0, while increasing the operation frequency and voltage in case the difference of the frames is less than 0, depending on the determination result obtained in the step (a);

(c) setting the operation frequency and voltage for maximum operation frequency and voltage until the scaled operation frequency and voltage is compared with the predetermined maximum operation frequency and voltage to exceed the maximum operation frequency and voltage;

(d) changing a current mode to a drop mode if it is predicted that the operation frequency and voltage is set for the maximum operation frequency and voltage and the number of the current frames cannot pass as much as that of frames at a next time interval;

(e) determining whether the difference of the frames is greater or less than O1 in case the interrupt is generated and the previous mode is the drop mode;

(f) increasing a drop rate in case the difference of the frames is less than 0 depending on the determination result obtained in the step (e), while reducing the drop rate in case the difference of the frames is greater than 0;

(g) setting the operation frequency and voltage to be less than the maximum operation frequency and voltage and setting the current mode for the delay mode, in case the drop rate is less than 0, after the step (f) is performed; and (h) performing the MPEG decoding by finally set operation frequency, voltage and delay or drop rate until a next interrupt is generated.

3. The method of claim 2, wherein the difference of the frames is the difference between the number of the current frames and that of the set frames.

4. The method of claim 2, wherein an electric power mode or decoding Quality Of Service QoS can be set by a user's request; and electric power consumption can be adjusted, while a part of frames is being dropped and simultaneously the set QoS is being supported by the electric power mode or decoding QoS during the MPEG decoding.

5. A method for MPEG decoding using dynamically varying voltage and frequency of a processor comprising the steps of:
(a) predicting decoding time until a next interrupt is generated after a current interrupt is generated; and
(b) setting an operation frequency and voltage by predicted MPEG decoding time until the next interrupt is generated.

6. The method of claim 5, wherein the step (a) is to predict the decoding time until the next interrupt is generated depending on both a type and size of frames and a system speed.

7. The method of claim 5, wherein the step (b) is to reduce the operation frequency and voltage if the difference of the frames is greater than 0, while to increase the operation frequency and voltage if the difference of the frames is less than 0.

8. The method of claim 5, wherein the difference of the frames is the difference between the number of current frames and that of set frames.

9. The method of claim 5, wherein an electric power mode or decoding Quality Of Service QoS can be set by a users request; and electric power consumption can be adjusted, while a part of frames is being dropped and simultaneously the set QoS is being supported by the electric power mode or decoding QoS during the MPEG decoding.

10. The method of claim 5 further includes the step of setting the operation frequency and voltage respectively for minimum operation frequency and voltage to set a delay value on a current frame if the set operation frequency and voltage are less than the minimum operation frequency and voltage.

11. The method of claim 5 further includes the step of setting the operation frequency and voltage respectively for maximum operation frequency and voltage to fix a drop rate of a current frame if the set operation frequency and voltage are greater than the maximum operation frequency and voltage.

12. The method of claim 5 further includes the step of performing the MPEG decoding by finally set operation frequency, voltage and delay or drop rate until the next interrupt is generated.

* * * * *